March 24, 1936. C. E. QUICK 2,035,188
DOUGH TREATING MACHINE
Filed Sept. 20, 1934 4 Sheets-Sheet 1

Inventor
Claude E. Quick
By A. Trevor Jones
Atty.

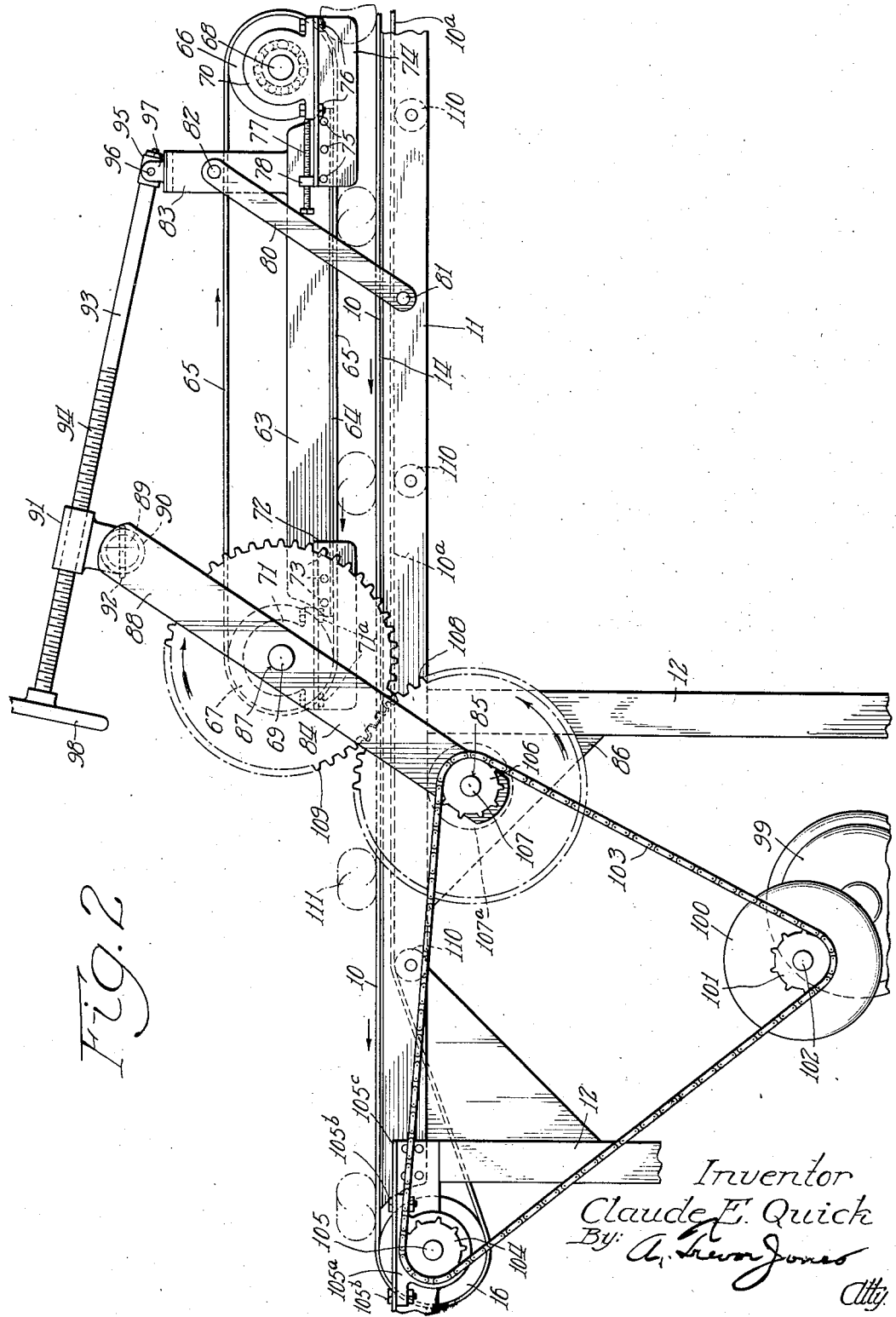

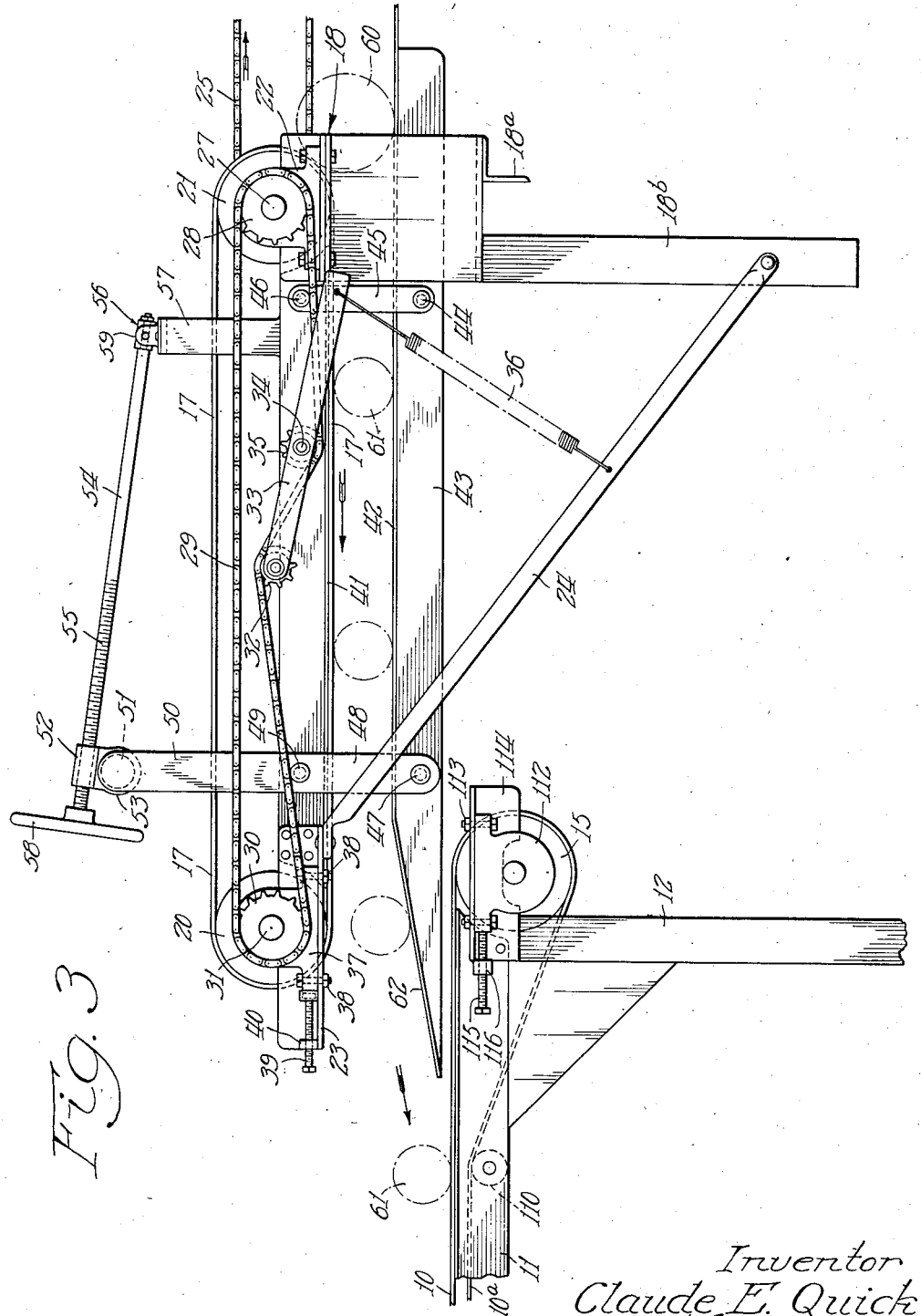

March 24, 1936.         C. E. QUICK          2,035,188
                  DOUGH TREATING MACHINE
              Filed Sept. 20, 1934      4 Sheets-Sheet 4
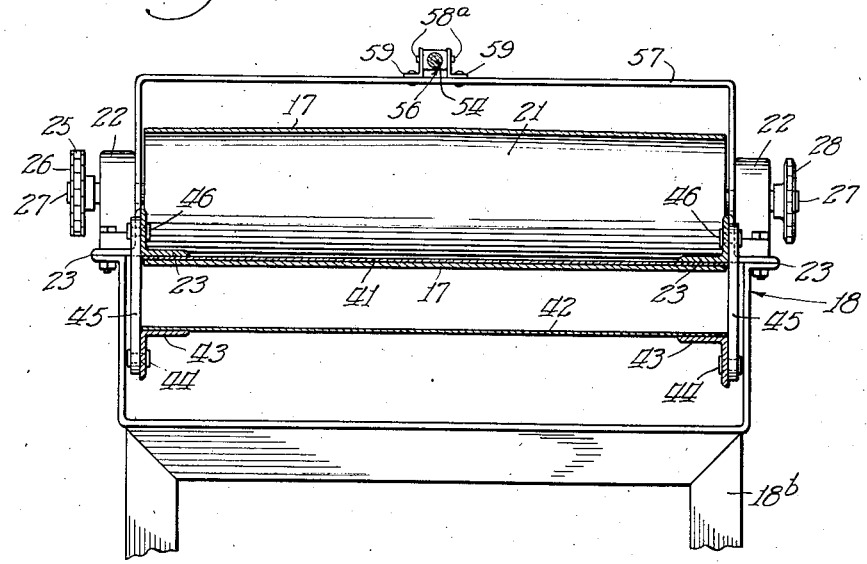
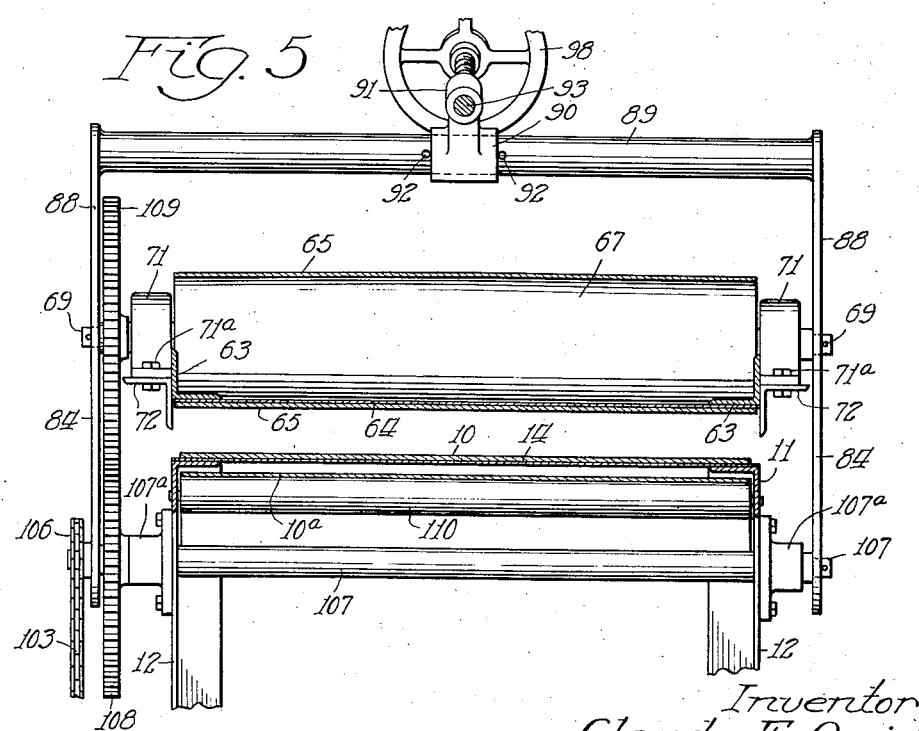
Inventor
Claude E. Quick
By: [signature]
Atty.

Patented Mar. 24, 1936

2,035,188

UNITED STATES PATENT OFFICE 2,035,188

DOUGH TREATING MACHINE

Claude E. Quick, Glendale, Calif., assignor to Western Bakeries Corporation, Ltd., Los Angeles, Calif., a corporation of California Application September 20, 1934, Serial No. 744,753

10 Claims. (Cl. 107—9)

This invention relates to mechanism for treating dough or the like, more particularly for bakery use.

The invention is of marked utility in connection with machines for handling rolls of dough twisted preliminary to the baking of a so-called twist bread.

Among other objects, the invention provides improved means for adjusting the apparatus for operation upon dough rolls of varying thickness.

Another object of the invention is to provide an apparatus of the character set forth which is simple and comparatively inexpensive and yet rapid and efficient in operation.

With these and other objects in view, my invention consists in the construction, arrangement, and combination of the various parts whereby the objects contemplated are attained, as hereinafter more fully set forth, pointed out in the claims, and illustrated in the accompanying drawings, in which—

Figure 2 is an enlarged side elevational view of the left-hand end of the mechanism shown in Figure 1;

Figure 3 is a view similar to Figure 2 of the right-hand end of said structure;

Figure 4 is a cross-section taken on the line 4—4 of Figure 1, somewhat enlarged, and looking in one direction; and Figure 5 is a similar cross-section taken on the line 5—5 of Figure 1, looking in the opposite direction.

Figure 1:
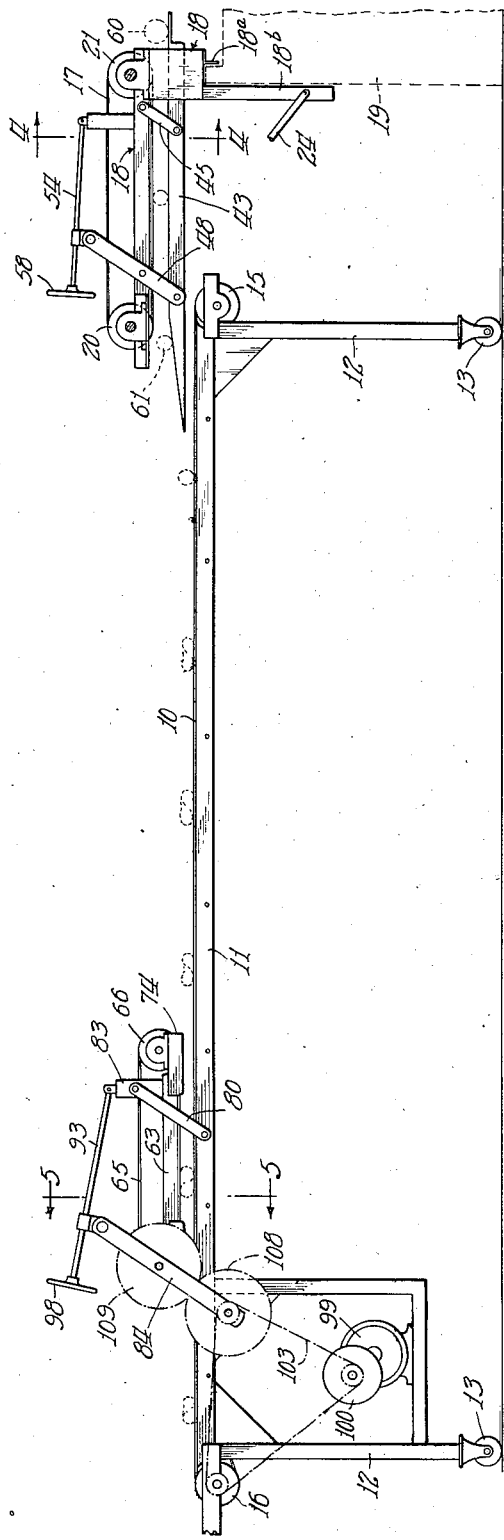
Figure 1 is an assembled side elevational view of my improved mechanism, shown somewhat diagrammatically.

In the commercial baking of so-called twist bread, it is desirable to begin the twisting operation with rolls of dough longer than the usual rolls produced by conventional molding apparatus, and it is furthermore desirable that means be provided, which is not found in conventional molding apparatus, for readily varying the lengths and diameters of the rolls to suit different requirements for the twist bread and for controlling the thickness of the ultimate loaf. After two or more elongated rolls of dough have been twisted together, either by machine or by hand, it is frequently desirable that the composite lump of dough be slightly flattened before it is placed in the baking pan, this flattening operation, among other objects, contributing to control of the thickness of the loaf and also to the homogeneity of the composite loaf. In the present instance I have illustrated my invention in conjunction with the hand operation of twisting the rolls of dough, but it will be apparent that my invention is of like utility in conjunction with machines now on the market for performing the actual twisting operation mechanically.

Referring in detail to the structure shown in the drawings, I have shown in general a conveyor such as the endless belt 10 carried by a frame 11 which is desirably in the form of a portable carriage mounted on four standards 12 and provided at their lower ends with casters 13. The upper part of the frame 11 is in the form of a flat polished metallic plate 14 extending substantially the length of the frame and over which the upper run of the belt 10 moves in sliding contact therewith to be supported thereby, the belt 10 being trained about rollers 15, 16 at each end of the frame.

At one end of the portable conveyor represented by the frame 11 and endless belt 10, I have provided, in this instance, a separate conveyor portion in the form of another shorter endless belt 17 carried by a frame 18 which, as here shown, may be mounted by any appropriate means (such as the depending angle bar 18a and leg frame portion 18b) on a conventional molding machine indicated in dotted lines at 19 at the right-hand end of Figure 1.

As best shown in Figure 3, the belt 17 is trained at each end about rollers 20, 21 suitably journalled at each end in anti-friction pillar bearing blocks 22 carried by the frame 18, the frame having a horizontally extending portion 23 for this purpose, this horizontally extending portion 23 being supported in cantilever fashion by the brace 24 extending diagonally therefrom to a lower part of the frame. One of the belt rollers, in this instance the roller 21, may be driven from the same mechanism which drives the molder 19 by an endless chain 25 meshing with the sprocket 26 at one end of the shaft 27 for the roller 21. At the opposite end of the shaft 27 is affixed another sprocket 28 about which is trained another drive chain 29 which also meshes with a sprocket 30 fixed on shaft 31 of the roller 20. To take up the slack in chain 29 the lower run thereof may be trained over an idler sprocket 32 carried at the free end of a lever 33 pivoted at 34 on the frame portion 23, the chain thereafter passing in under engagement with another idler sprocket 35 concentric with the pivot 34. The opposite end of the lever 33 is connected by the tension coil spring 36 with the brace 24.

To adjust the tension of the belt 17 the bearings for one of the rollers, in this instance the roller 20, may be mounted on a bracket 37 which is secured to the frame portion 23 by bolt-and-nut members 38 which pass through slots in the frame portion 23 and are adjustable longitudinally thereof as by a screw adjustment member 39 rotatably secured at one end to the bracket 37 and having its free end passing through a threaded sleeve 40 carried by the frame. Thus rotation of the screw member 39 outwardly of the sleeve 40 retracts the bracket 37. There may be a similar arrangement on each side of the roller 20, it being sufficient for this purpose that one only be here shown. To prevent flexing upwardly of the lower run of the belt 17, the belt at this point desirably passes under in sliding engagement therewith a polished metallic plate 41 carried by the frame. This plate may be suitably secured to the frame horizontal extension portions 23 thus forming a part of the frame and reinforcing these horizontal portions 23 which may be in the form of beams at each side of the frame.

A contact member to cooperate with the traveling conveyor belt portion 17 is here represented by a pressure plate 42 having its main portion parallel to the belt 17 and suspended thereunder, in face to face relation therewith, between the extending arms of the frame portion 18, which is formed U-shape for this purpose. The plate 42 is shown secured at each side to a pair of angle beams 43. To movably support the plate 42, near one end thereof, as at 44, are pivoted to the angle beams 43 a pair of links 45, these links being pivoted also to the frame 23 as at 46. Near their opposite ends, the beams 43 are pivoted as at 47 to another pair of links 48, which are in turn pivoted as at 49 also to the frame 23, the distance between the pivots 44, 46 and the pivots 47, 49 being equal so that the plate 42 may be swung transversely of the belt 17 but always in parallel relation therewith. These two pairs of links are carried laterally outwardly of the frame portion 23 so that the belt 17 moves freely therebetween.

To adjust the position of the plate 42 with respect to the belt 17, I have shown the links 48 extended upwardly as at 50 above the belt and frame and connected at their upper ends by a cross-bar 51 in the form of a cylindrical shaft. An interiorly threaded sleeve or nut 52 is pivoted upon the shaft 51 as by having a knuckle portion 53 of the sleeve surround the shaft with a rotative fit. By adjusting the distance of the upper end of the links 50 from a plane parallel with the belt 17 and plate 42, the distance between the plate 42 and the lower run of the belt may be readily varied. To so swing the links transversely of the frame and maintain them in desired adjusted position, I may provide a rod 54 having threads 55 thereon which passes through the sleeve 52 in threaded engagement therewith and is rotatably secured to an anchor member 56 carried by the yoke 57 which spans the belt 17. The hand wheel 58 at the opposite end of the rod 54 beyond the place where it passes through the sleeve 52 permits ready rotation of the rod and consequent swinging of the links 50 transversely of the belt and frame (by reason of screw movement of the sleeve on the rod, the rod being fixed against horizontal movement with respect to the frame), which in turn causes swinging of the links 45 and plate 42. Pivoting of the sleeve 52 on the links 50 permits the rod 54 to adjust itself to the angular position of the links 50, and this is further accommodated by swiveling the anchor member 56 to the yoke 57 as at 58a in bearings provided by brackets 59 suitably secured to the yoke.

As best shown in Figure 3, the plate 42 extends to the right beyond the frame 18 and thus may receive, as by gravity, from the conventional molder 19 the usual lump or cylinder of dough 60. As the belt 17 is caused to turn so that its lower run moves to the left in Figure 3, the roll of dough 60 is engaged by the moving belt 17 and is moved through the space between the lower run of the belt 17 and the opposed contact member represented by the plate 42, the lower run of the belt 17 moving to the left. During the progress of the roll therethrough, its diameter is reduced to the form shown at 61, its length being also increased. This action is desirable for two reasons: first, in that it makes a longer and uniform roll of dough for purposes of twisting two rolls 61 together, and in the second place, it desirably improves the texture of the dough, being in the nature of a further kneading process.

Since in this instance the plate 42 is normally stationary while the belt 17 moves, the roll of dough is rotated and its diameter is reduced, thus elongating the roll while determining its uniform diameter, while at the same time the dough is kneaded so as to improve its homogeneity and texture.

To vary the diameter and length of the roll 61, it is only necessary to quickly rotate the hand wheel 58 which as already described acts upon the upper end of the links 50, these links acting as a lever to alter the relation of the sides of the parallelogram formed by the belt 17, the contact plate 42, and the links 45 and 48. Also the pairs of links 45 and 48 form with the belt and plate a parallelepiped, which is similarly acted upon.

At its left-hand end, as shown in Figure 3, the plate 42 is inclined downwardly as at 62 to direct the elongated rolls of dough 61 toward and onto the conveyor belt 10, the beams 43 being correspondingly tapered for this purpose.

One or more workmen may stand alongside of the belt 10 and as the rolls of dough come from the elongator just described onto the belt 10, two or more of these rolls may be twisted together by hand and left on the belt to be carried further toward the left, as indicated in Figure 1, where they are next desirably acted upon to slightly flatten the twisted dough.

As best shown in Figures 2 and 5, this flattener is also suspended, in this case above the belt 10, on the principle of a parallelogram and parallelepiped acted upon by a lever, similarly in principle to the elongator already described. The flattener includes a frame formed by longitudinally extending angle bars 63 to which are suitably secured a smooth polished plate 64 which reinforces the frame and also acts as a backing for the lower run of the belt 65, this belt being trained about the rollers 66, 67 having their shafts, 68, 69 journalled in anti-friction bearings 70, 71 respectively. The bearings 71, being bolted thereto by the nut-and-bolt members 71a, may be carried by the brackets 72 suitably secured to the frame as by bolts 73. The bearings 70 may be similarly secured to brackets 74 secured to the frame by bolts 75, the bearings 70, however, being movable on the bracket 74 as by having their bolt-and-nut members 76 pass through slots in the bracket. By rotation of the screw-bolt 77 in the interiorly threaded sleeve 78, the bearings 70 may be moved on bracket 74 to tighten the belt 65, the bolt-andnut member 76 being thereafter tightened to clamp the bearing in this adjustment. When the belt is so tightened, rotation of one of the rollers 66 or 67 will drive the belt.

The frame 63 is here shown supported at one end by a pair of links 80, one at each side of the frame laterally outwardly of the belt 65 and pivoted at 81 on the carriage 11, the links 80 being also pivoted as at 82 to a yoke 83 which spans the frame 63 and belt 65.

At its other end the frame 63 carrying the belt 65 is supported by another pair of links 84, one at each side, pivoted at 85 on the portion 86 of the carriage 11 and also pivoted at 87 on the shaft 69 for the roller 71. The distances between the pivots 81, 82 and the pivots 85, 87 are equal so that a line connecting all of these pivot points describes a parallelogram.

To adjust the position of the frame 63 and the belt 65 transversely of (i. e. toward or away from) the main conveyor belt 10, I may extend the links 84 upwardly above the plane of the parallelogram as at 88, this portion 88 of the links 84 providing a lever for adjustment purposes. The upper portions 88 of the links 84 may be connected together by a cross-bar 89 of cylindrical form so as to receive with a rotative fit centrally thereof the knuckle portion 90 of an interiorly threaded sleeve 91. The stop pins 92 affixed in the cross-bar 89 may maintain the knuckle 90 centered on the cross-bar. To act upon the lever thus provided by cross-bar 89 and upper ends 88 of the links 84 I may provide another screw action mechanism similar to the screw-action mechanism for the elongator and including the rod 93 threaded as at 94 passing through the sleeve 91 in threaded engagement therewith to be anchored against longitudinal movement with respect to the sleeve by being rotatively secured to a bushing 95 pivoted as at 96 on a bracket 97 suitably secured centrally of the yoke 83. The hand-wheel 98 fixed on the rod 93 at its opposite end beyond the place where it passes through the sleeve 91 permits ready rotation of the rod to advance or retract the sleeve 91 and consequently to vary the angle of the links 84, thus moving the belt 65 toward or away from the belt 10. It will be perceived that this results from the fact that as the links 84 are swung downwardly toward a line parallel with the belts, the distance between the upper ends 88 of the links 84 and a relatively fixed point such as the pivot 82 for example is decreased, while as the upper ends 88 of the links 84 are moved in the opposite direction toward the vertical, the distance between the upper ends 88 of the links 84 and such a fixed point as the pivot 82, is increased. The rod-and-sleeve screw connection 91, 94 maintain any desired distance between the upper ends 88 of the links 84 and such a relatively fixed point as the pivots 82 to maintain the belt 65 in its desired adjusted position, since the frame 63 cannot move downwardly without decreasing this distance, which is prevented by the rod 93. Thus the mechanism just described constitutes a contractible clamping means carried entirely by the links themselves and bodily movable therewith.

The belt 65 may be driven from the same source of power which drives the main belt 10. As here shown, a motor 99 driving through a conventional speed-reduction mechanism 100 has a sprocket wheel 101 affixed on its output shaft 102. An endless chain 103 passing around the sprocket 102 drives both the belt 10 and the belt 65. The belt 10 is driven by the chain 103 through the medium of a sprocket wheel 104 affixed on the shaft 105 of the roller 16 for the main belt 10. The shaft 105 is journalled in an anti-friction bearing 105a secured as by bolt-and-nut members 105b to the bracket 105c, secured to the carriage 11, at its extreme left-hand end as shown in the drawings. The belt 65 is driven by the chain 103 through the intermediation of a sprocket wheel 106 fixed on a shaft 107 journalled in bearings 107a concentric with the pivot point 85 of the link 84 and upon which one of these links 84 has a bearing. Affixed on shaft 107 also is a spur gear 108 which meshes with another spur gear 109 carried by one of the links 84 concentric with the shaft 69. Since the shaft 69 is also the shaft for the roller 71, rotation thereof, through the gears 108, 109 will move the belt 65 so that the lower run of the belt 65 will move in the same direction as the upper run of the belt 10, that is toward the left in Figures 1 and 2. Since the gears 108, 109 are of the same diameter, the belts 10 and 65 will travel at the same speed and the gears will be in mesh in any angular position of the links 84 already referred to, the gear 109 rolling about the gear 108 upon the planetary principle when the links 84 have their angle changed.

As the rolls of dough twisted together are carried by the conveyor belt 10 beneath the flattener belt 65, the vertical distance occupied by the dough is decreased slightly and the twisted dough is somewhat flattened to the form shown at 111 where it is now ready to be taken from the conveyor belt 10 at the extreme left-hand end of the views, to be placed in the usual baking pan. The brackets 72, 74 may be extended somewhat below the lower run of the belt 65 to act as lateral guards for the dough at this point. Since the belts 10 and 65 travel in the same direction, at the same speed, there is no tendency to rotate the dough under the flattener.

The roller 15 at the right-hand end of the belt 10 shown in the drawings may be journalled in an anti-friction bearing 112 carried as by bolt-and-nut members 113 on a bracket 114 suitably secured to the carriage 11. The bolt-and-nut members 113 may pass through slots in the bracket 114 so that by rotation of the screw bolt 115 in threaded sleeve 116 the bearing 112 may be moved on the bracket to tighten the belt 10, the bolts 113 being then tightened to clamp it in this adjustment, so that the belt 10 will run at the same speed as the gear 108, the sprocket wheels 101, 104 and 106 being equal in diameter and number of teeth to maintain this uniform speed.

The lower or return run 10a of the belt 10 travelling to the right as shown in the diagrams, may be trained over a series of idler rollers 110 rotatably secured upon the under side of the carriage 11.

Obviously, the invention is not limited to details of construction herein shown. Furthermore, it is not essential that all features of the invention be used conjointly since various combinations and sub-combinations may be advantageously employed. For example, the conveyor 10 and the flattener might be used with or without the elongator, which is shown separable for this purpose as well as for the purpose of facilitating the operative assembly of parts permitting the delivery of the initial rolls of dough to and from the elongator by the action of gravity.

I claim:

1. In mechanism of the class described, the combination of a frame, an endless moving belt carried thereby, a pair of relatively light links pivoted on the frame and depending therefrom at one end at each side thereof laterally outwardly of the belt, another pair of heavier links pivoted on the frame and having one end of each said link depending therefrom at each side thereof at its opposite end laterally outwardly of the belt, the last-mentioned pair of links being extended above the frame beyond their pivot point, a cross-bar joining said last-mentioned pair of links where so extended, a yoke carried by and spanning the frame at its end adjacent the first-mentioned pair of links, and adjustable means interconnecting the cross-bar and yoke for varying the distance therebetween to control movement of the links relative to the frame.

2. The structure of claim 1 in which an interiorly threaded sleeve is pivotally carried by the cross-bar and a threaded rod passes through said sleeve in threaded engagement therewith and is anchored to the said yoke, the rod being also swiveled on said yoke.

3. The structure of claim 1 wherein an interiorly threaded sleeve is pivotally carried by the cross-bar and a threaded rod passes through said sleeve in threaded engagement therewith, said rod being anchored at its opposite end to a member pivoted to the yoke and wherein a hand wheel is affixed to the rod at its free end beyond the place where it passes through the threaded sleeve.

4. In mechanism of the class described, the combination of a frame, an endless moving belt carried thereon, a pair of links pivoted on the frame and extending thereabove laterally outwardly of the belt, another pair of links pivoted on the frame laterally outwardly of the belt, a second frame pivotally carried on the first frame threaded on and swingable toward and away therefrom, a second endless belt carried by said second frame parallel with the first-mentioned belt, a gear wheel carried by the first-mentioned frame concentric with the pivot point thereon of one of the pairs of links, another gear wheel carried by the second frame concentric with the pivot point thereon of said last-mentioned pair of links, said gear wheels meshing in all relative positions of the frames, means for driving the second-mentioned belt from the second-mentioned gear, and means for adjusting the position of the second frame transversely of the first-mentioned frame.

5. The structure of claim 4 wherein the means for adjusting the position of the second frame includes a lever provided by an extension of one of the links beyond one of its pivot points and a medium acting to move said lever.

6. The structure of claim 4 wherein the means for adjusting the position of the second frame includes a lever provided by extensions above the second frame of the links to which the gear wheel is pivoted, a threaded sleeve pivoted to said extensions, a threaded rod passing through said sleeve secured at one end against longitudinal movement with respect to the sleeve, and a hand wheel for rotating the rod.

7. A device of the class described, comprising a pair of parallel opposed contact members one of which is movable toward and away from the other, a pair of links pivoted to both members to provide said adjustability, said links carrying the movable member, one of the links being extended beyond both of the members to provide a lever arm, between which and the other member one of the members is disposed, an interiorly threaded sleeve swiveled on said lever arm, a threaded rod passing through the sleeve and anchored at one end to one of the members to permit rotation of the rod on its own axis and also swinging movement of the rod on an axis coincident with the point at which it is anchored whereby the position of the movable member with respect to the other member may be fixed by fixing the distance from the outer end of the lever arm to the said anchor point by rotation of the rod in the sleeve and the rod is otherwise bodily movable to adjust itself to varying positions of the parts.

8. In mechanism of the class described, comprising a pair of parallel opposed contact members one of which is adjustable toward and away from the other, a pair of links pivoted to both members to provide said adjustability, said links carrying the movable member, one of the links being extended beyond both of the members to provide a lever arm between which and the other member one of the members is disposed, and means carried by and bodily movable transversely of the members with said lever arm for fixing the angularity of the links with respect to the members.

9. In mechanism of the class described provided with a moving belt, a support for the belt, a contact member parallel therewith, said contact member forming with said belt two sides of a parallelepiped, the other four sides of which are formed by a plurality of pairs of parallel links pivoted to the support and swingable transversely of the member, whereby the belt and member are relatively movable toward and away from each other in parallel relation, the combination wherein two of said links are extended beyond the parallelepiped, and including manually adjustable take-up mechanism for varying the distances from the said extended ends to the opposite links, wherein the said extended ends are connected by a cross-bar and the take-up mechanism comprises an internally threaded sleeve pivoted to the said cross-bar and wherein a threaded rod anchored at one end to the member in the vicinity of one of the pairs of links has its free end passing through said sleeve in threaded engagement therewith.

10. In mechanism of the class described, provided with a moving belt, a support for the belt, a contact member parallel therewith, said contact member forming with said belt two sides of a parallelepiped, the other four sides of which are formed by a plurality of pairs of parallel links pivoted to the support and swingable transversely of the member, whereby the belt and member are relatively movable toward and away from each other in parallel relation, the combination wherein two of said links are extended beyond the parallelepiped, and including manually adjustable take-up mechanism for varying the distances from the said extended ends to the opposite links, wherein the take-up mechanism includes an internally threaded sleeve pivoted to the said extended ends and wherein a rod passes through the sleeve and is pivoted at its anchored end in the vicinity of one of said pairs of links and has a hand wheel at its free end beyond the place where it passes through the threaded sleeve.

CLAUDE E. QUICK.